United States Patent
Morris

(10) Patent No.: US 8,452,945 B2
(45) Date of Patent: May 28, 2013

(54) INDIRECT INDEXING INSTRUCTIONS

(75) Inventor: Dale Morris, Steamboaat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1626 days.

(21) Appl. No.: 10/245,106

(22) Filed: Sep. 17, 2002

(65) Prior Publication Data

US 2004/0054873 A1 Mar. 18, 2004

(51) Int. Cl.
*G06F 15/00* (2006.01)
*G06F 9/30* (2006.01)
*G06F 9/40* (2006.01)

(52) U.S. Cl.
USPC ........................... 712/208; 712/210; 712/220

(58) Field of Classification Search
USPC .. 712/203, 211, 213, 227, 248, 210; 711/214, 711/220
See application file for complete search history.

(56) References Cited

U.S. PATENT DOCUMENTS

| | | | | |
|---|---|---|---|---|
| 3,624,373 A * | 11/1971 | Birchall | .......................... | 708/532 |
| 4,206,503 A * | 6/1980 | Woods et al. | .................. | 711/212 |
| 5,440,702 A * | 8/1995 | Brewer et al. | ................. | 712/223 |
| 5,442,769 A * | 8/1995 | Corcoran et al. | ............. | 710/316 |
| 5,504,914 A * | 4/1996 | Lai | .................. | 712/226 |
| 5,615,348 A * | 3/1997 | Koino et al. | ................... | 712/228 |
| 5,790,443 A * | 8/1998 | Shen et al. | ..................... | 708/491 |
| 5,890,222 A * | 3/1999 | Agarwal et al. | ............... | 711/220 |
| 6,072,508 A * | 6/2000 | Devic | ............................ | 345/553 |
| 2004/0054873 A1* | 3/2004 | Morris | .......................... | 712/210 |
| 2004/0064677 A1* | 4/2004 | Morris | .......................... | 712/210 |

* cited by examiner

*Primary Examiner* — Andrew Caldwell
*Assistant Examiner* — George Giroux

(57) ABSTRACT

A data processor includes an instruction decoder, an execution unit, a general-purpose register file, and an index-register file. The instruction set for the data processor includes indirect-indexing instructions to facilitate table lookups. When executing such an instruction, the execution unit reads an index stored at an index-register location specified by the instruction. The index refers to a general-purpose register location, which is then read and copied to a general-purpose register location as specified by the instruction. The disclosed execution unit includes four functional units, each with two read ports and a write port so that eight table lookups can be performed in parallel.

8 Claims, 3 Drawing Sheets

INDIRECT INDEXING INSTRUCTIONS

BACKGROUND OF THE INVENTION

The present invention relates to computers and, more particularly, to computer instruction sets. A major objective of the invention is to improve computer performance when performing large numbers of table lookups.

Functions of the form y=f(x) are applied repeatedly to a large number of input values in video compression, and image-processing, encryption, code conversion, and other applications. Generally, the functions applied can be expressed as mathematic expressions, but it is often more convenient to implement some functions in the form of lookup tables, with the independent variable (x) corresponding to the address and the dependent variable (y) corresponding to the contents at that address.

Lookup tables are conventionally held in main memory. A table is typically organized in memory as an array of elements, where each element holds the value of one table entry. Instructions then simply specify the desired memory locations, the contents of which are read out to provide the desired function results. While such lookups can be implemented at very high speeds, they can still limit performance in applications, such as video processing, encryption, and code conversion where very large numbers of such lookups are required. What is needed is a way to further improve performance when repeated table lookups are required.

SUMMARY OF THE INVENTION

The present invention provides for indirectly indexing general-purpose registers. To this end, a microprocessor can include an instruction decoder, an execution unit, a general-purpose register file, and an index-register file. The execution unit can have one or, preferably, more functional units, each connected to a general register file that has one or more read ports dedicated to that functional unit and one or more write ports dedicated to that functional unit. Typically, the general register file has two read ports and one write port dedicated to each functional unit.

When executing an indirect-indexing instruction, a functional unit first accesses a location of the index-register file specified by the instruction. An index stored at this location is used to select a register to be read from the general-purpose register file, which is fed to the functional unit; the index is also used to select a subword location to be read from within the general-purpose register. As many index-file locations can be specified as there are read ports for the functional unit, so the number of read ports determines the number of general-purpose register locations that can be accessed per instruction per functional unit.

Typically, functional units have two read ports coupled to a general-purpose register file. In such cases, the invention provides for two lookup operations in parallel per functional unit, and for an overall parallelism of twice the number of functional units. More generally, the parallelism for an individual functional unit can be equal to the number of read ports it has coupled to a general-purpose register file, and for a processor which includes multiple functional units, the overall parallelism can be equal to the total number of read ports coupled to the general-purpose register file across all functional units.

The invention has applicability to table-lookups, particularly for tables too large to fit within one or two general-purpose registers, but small enough to fit within a general-purpose register file. For such applications, an instruction can copy the contents of an indexed general-purpose register to a specified location of a result register (typically also included in the general-purpose register file). However, the invention is not limited to simple lookups. The result can be a partial or non-identity function of the indexed contents. For example, the result can be a unary (one-operand) function of the indexed contents (e.g., a shift-right version of the indexed contents); a two-operand function of two indexed values; or a two-operand function in which the second operand is directly specified by the instruction.

The invention provides for indirect-indexing instructions that completely overwrite a result register, and for those that preserve contents of a result register except as necessary for storing the result. The content-preserving embodiments reduce the number of instructions required to concatenate the results of several indirect-indexing instructions. On the other hand, they require an extra read port or other hardware complexity.

The present invention takes advantage of the trend for register-read ports to outnumber memory-read ports. For example, the Itanium 2 processor has two memory-read ports, but twelve register-read ports (associated with six functional units with two read ports each). The disparity in read ports is largely due to the relative proximity, small size and simplicity of registers versus a level-1 cache.

The present invention provides for greater parallelism in table lookups where the table fits within a register file but not within one or two registers. The parallelism can equal the total number of register-read ports available in an execution unit. For example, an execution unit with four functional units with two read ports each can perform eight table lookups in parallel. When applied to a large number of consecutive table lookups, this yields roughly a factor of four or eight performance improvement over a memory-based method using respectively two or one memory read ports. These and other features and advantages of the invention are apparent from the description below with reference to the following drawings.

DETAILED DESCRIPTION

Computer system AP1 includes a data processor 110 and memory 112. The contents of memory 112 include program data 114 and instructions constituting a program 100. Data processor 110 includes an execution unit EXU, an instruction decoder DEC, a general-purpose register file RGS, an index-register file RIS, an address generator ADG, and a router RTE. Unless otherwise indicated, general-purpose register file RGS includes all general-purpose registers referenced and illustrated herein, while index-register file RIS includes all index registers referenced herein. All registers store sixty-four bits unless otherwise indicated.

Execution unit EXU includes four functional units FU1-FU4. Each functional unit has two read ports and one write port; each of these ports can be coupled to any register of index register file RIS and any register of general-purpose register file RGS. Generally, each functional unit performs operations on data 114 in accordance with program 100. To this end, each functional unit can command (using control lines ancillary to internal data bus DTB) address generator ADG to generate the address of the next instruction or data required along address bus ADR. Memory 112 responds by supplying the contents held at the requested address along data and instruction bus DIB. In an alternative embodiment, each functional unit has a separate read port and a write port coupled to the index register file.

As determined by indicators received from each functional unit FU1-FU4 along indicator lines ancillary to internal data bus DTB, router RTE routes instructions to instruction decoder DEC via instruction bus INB and data along internal data bus DTB. The decoded instructions are provided to the functional units via control lines CCD.

Figure 1:
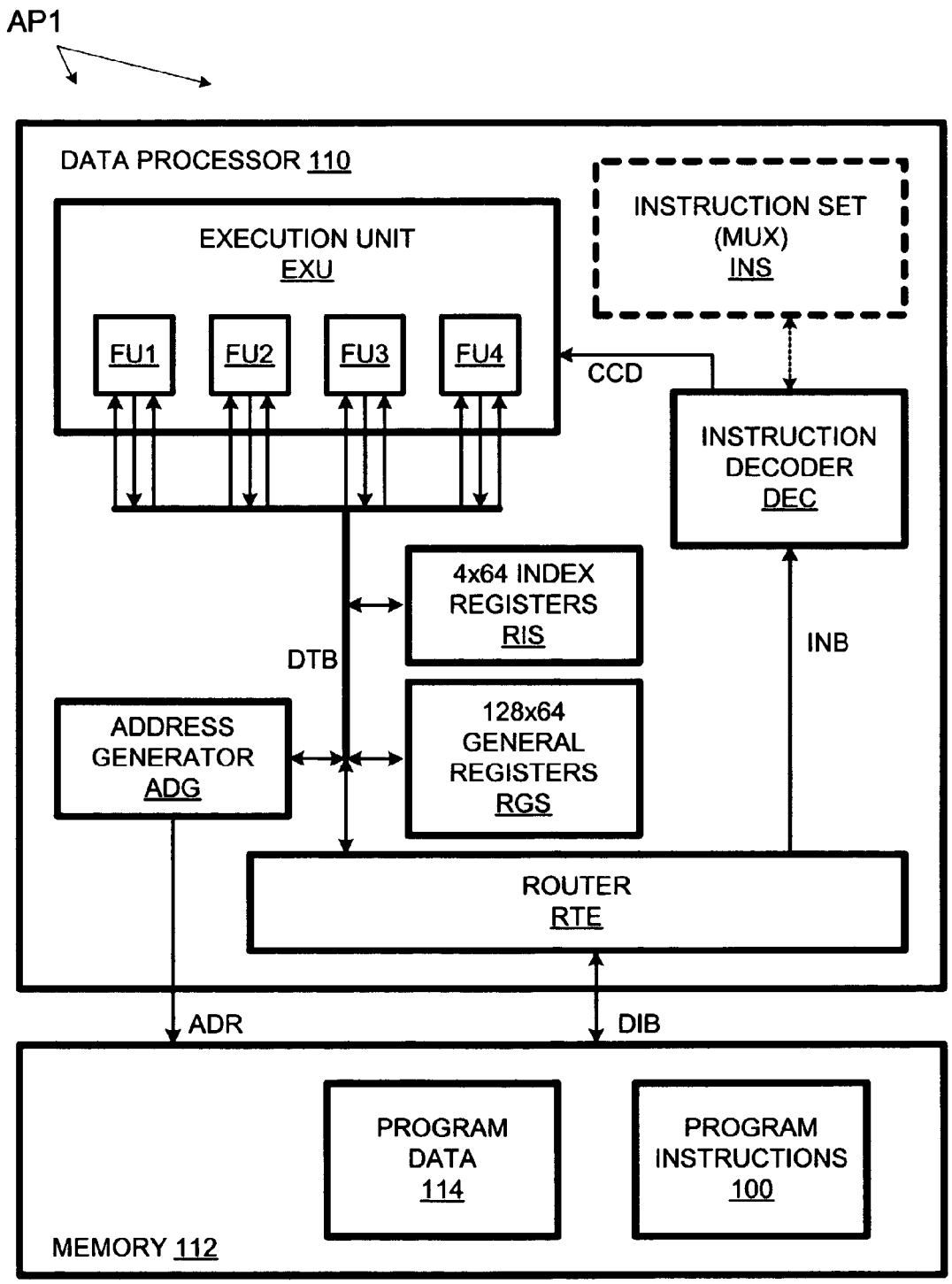
FIG. 1 is a schematic illustration of a computer system in accordance with the present invention.
Figure 2:
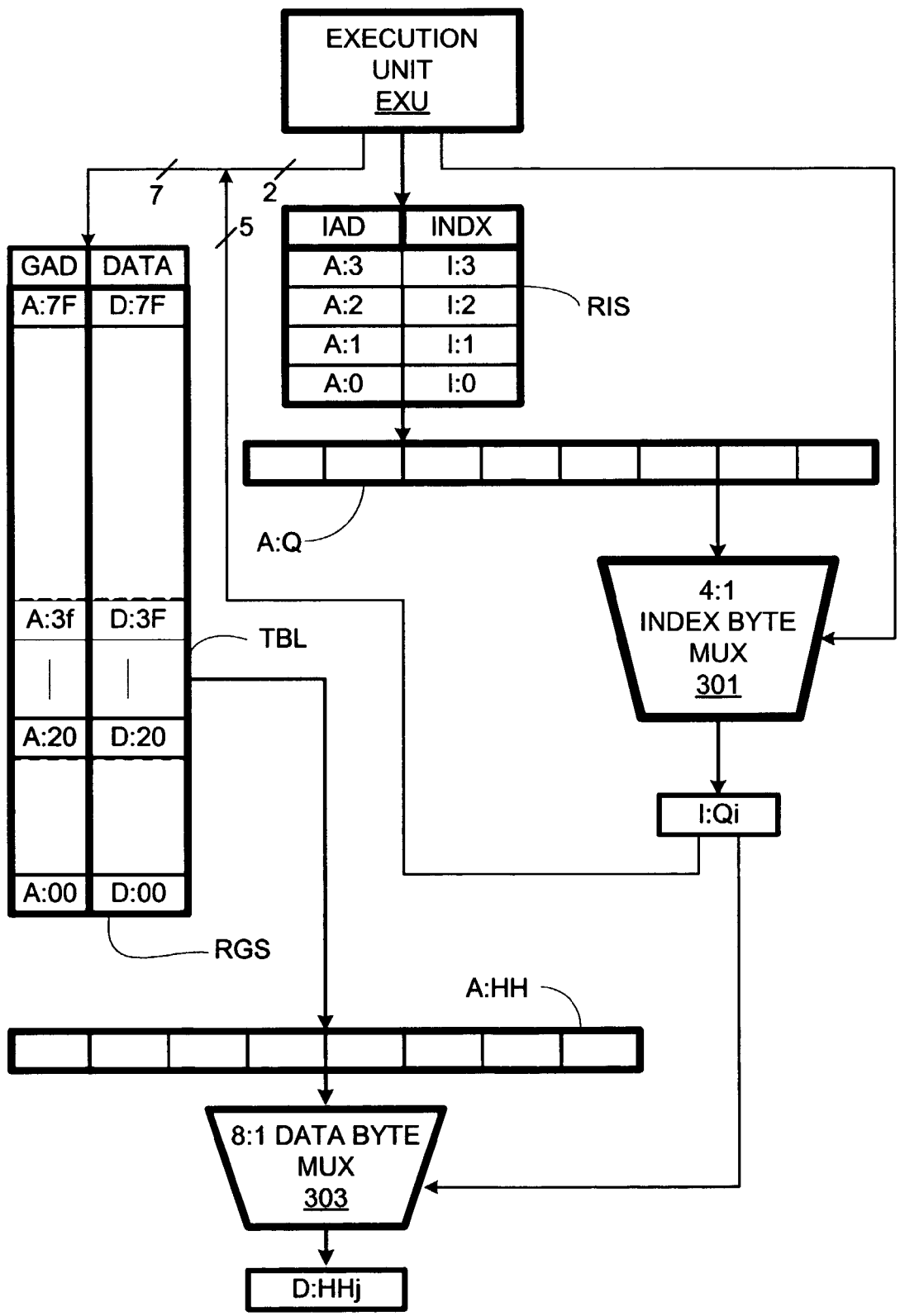
FIG. 2 is a flow diagram for a computer instruction in accordance with the present invention.

Data is typically transferred in and out of register files RIS and RGS according to the instructions. In FIG. 2, the addresses of general-purpose-register file RGS are presented in a column GAD, while the contents are presented in a column DATA. Also, the addresses of index-register file RIS are presented in a column IAD, while the contents (indices) are presented in a column INDX. Herein, the addresses of general-purpose register file RGS are expressed in the form A:HH, where "H" is a placeholder for a hexadecimal value. General-purpose-register contents are expressed in the form D:HH, whereas individual subwords are expressed in the form D:HHJ, where j is an integer ranging from 0 to 7. Similarly, addresses of index-register file RIS are expressed in the form A:Q, where Q is a quaternary value. Index-register contents are expressed in the form I:Q, with index register subwords taking the form I:Qi, with i being an integer ranging from 0 to 3.

Associated with data processor 110 is an instruction set of instructions INS that can be decoded by instruction decoder DEC and executed by execution unit EXU. Program 100 is an ordered set of instructions selected from instruction set INS. For expository purposes, data processor 110, its instruction set INS and program 100 provide examples of all the instructions described herein unless otherwise indicated.

The indirect-indexing instructions of set INS include register table lookup instructions of the general form RLookup ir1, gr1, gr2. Such instructions function as indicated in FIG. 2. A typical RLookup instruction specifies the start location (gr1) of a table TBL in a general-purpose register file, a selected index register (the most-significant bits of ir1) of index-register file RIS, a byte position within that index register (least-significant bits of ir1), and a result register (gr2).

When executing an RLookup instruction, a functional unit, e.g., FU1, communicates the table start address (2 bits) of table TBL to general-purpose-register file RGS, the index register address (2 bits) to index register file RIS, and the index-byte position (3 bits) to an index-byte mux 201, as shown in FIG. 2. The index-register address is used to select an index register A:Q from index-register file RIS. The index-byte position is used to select an index I:Qi stored at the indicated byte position of selected index register A:Q.

The five most-significant bits of the selected index byte are directed to general-purpose register file RGS to select among thirty-two permissible table registers. In other words, these five index bits are combined with the two table-start-position bits to select one of the 128 general-purpose registers A:HH. Concurrently, the three least-significant bits of index I:Qj are directed to an 8:1 data-byte mux 203 to select one byte D:HHJ from the selected general-purpose register A:HH. This byte is the desired lookup result, which is stored in the designated result register gr2.

For some indirect-indexing instructions the result register is completely overwritten, e.g., bit positions not required to store the table lookup value are filled with zeroes. In this case, results from different instructions can be shifted and ORed to concatenate results. Alternatively, such results can be shift-ORed to concatenate results. On the other hand, the invention provides for preserving the contents of result-register bit positions not required to store a result and for specifying the result-register subword location for storing a result. In this case, successive indirect-indexing instructions can write to the same result register without erasing prior results, and no further instructions are required to concatenate results.

Example 1

To evaluate y=f(x), a 256-entry 8-bit table is packed into thirty-two contiguous general-purpose registers of general-purpose register file RGS beginning with address A:20 (hex), aka A:32 (decimal). An 8-bit table-index value x is loaded into the least-significant byte position of one of the index registers. y=f(x) is evaluated using an RLookup ir1, gr1, gr2 instruction, where ir1 specifies the index register, gr1 specifies the table start position, and gr2 specifies a result register. In this case, the index byte position is fixed and need not be explicitly specified in the instruction; index-byte mux 203 is fixed to accept a least-significant byte as its input. Of course, it would be possible for any byte position to serve as the fixed indexed byte position within an index register.

Given four functional units FU1-FU4, four lookups can be performed in parallel, as opposed to a maximum of one or two in the prior-art method of reading the table from memory. In an embodiment with six functional units (comparable to the Itanium 2 processor) it is possible to perform four lookups from registers while performing two from memory, for a total of six lookups in parallel. Since this processor has six functional units, it is also possible to perform six lookups in parallel from registers as long as six index registers are available.

To combine eight results into a single register, shift and OR operations can be used. Either separate shift or OR instructions can be used, or a combined shift and OR instruction can be used.

Example 2

This is similar to example 1 except that the index byte position can be selected either by specifying it in an instruction field or by using a different instruction for each index-byte position. In the latter case, there can be eight instructions RLookup2.0-RLookup2.7, with the value after the period indicating a byte position within an index register. In one variant, the result is always written to the least-significant byte (or other fixed position) of the result register; in this case, ORing and shifting are required to combine result.

Preferably, the result is written to the byte position of the result register corresponding to the selected byte position of the index register. Alternatively, the instruction can specify a subword location for writing the result. Other byte positions of the result register can be overwritten with zeroes. This facilitates combining results into a single register using OR operation (obviating the otherwise necessary shift operations). This approach still takes eight instructions to perform eight lookups and so is comparable to example 1 in this regard. However, where eight input values x are presented packed in a 64-bit word that can be loaded directly (or even indirectly via a general-purpose register) into an index register, there can be a significant performance enhancement.

Example 3

Using the same table, there are eight instructions RLookup3P.0-RLookup3P.7, the numeric suffix specifying both the index byte position and the result byte position. However, instead of overwriting an entire result register, only the byte written to is changed, with the other seven bytes being preserved. This has the advantage that OR operations are not required to combine results. However, as only one instruction can write to a result register at a time, eight instruction cycles are required to complete eight lookups called for in an index register. This can be a problem for algorithms in which the latency of table lookups matters. Of course, it is still possible to specify different result registers, in which case, performance is comparable to example 2.

Example 4

Figure 3:
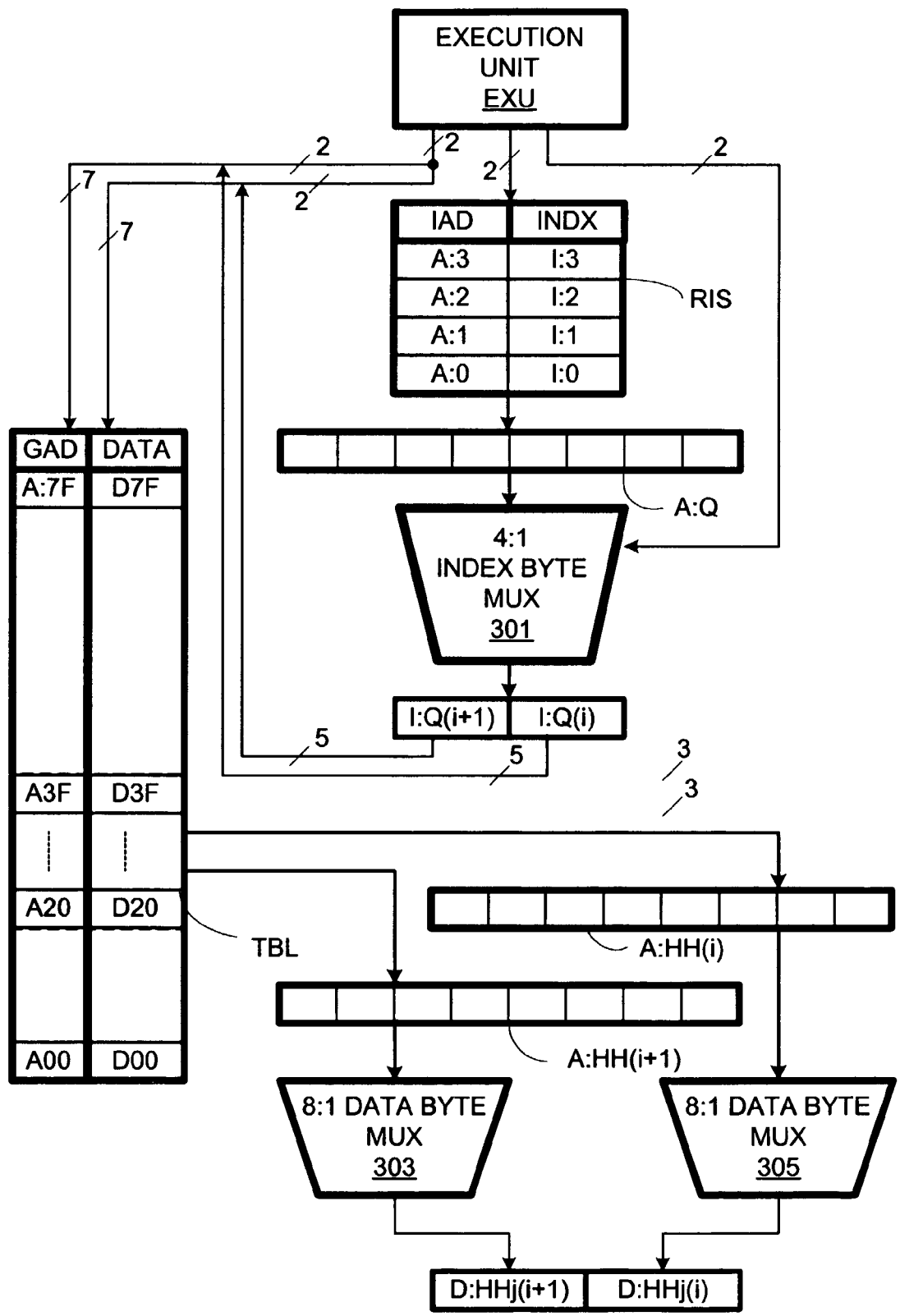
FIG. 3 is a flow diagram for another computer instruction in accordance with the present invention.

With reference to FIG. 3, the index registers are packed with eight bytes of table input values. Four instructions are used: RLookup4D.01, RLookup4D.23, RLookup4D.45, and RLookup4D.67 ("D" stands for "double"). Each instruction specifies a start address (two bits) for the table, an index register (two bits), a pair of byte positions (two bits), and a result register (seven bits). Since the index byte positions are addressed in pairs, the index-byte mux 301 is 4:1 with doublet subwords (instead of 8:1 with byte subwords for mux 201 of FIG. 2). The output of index-byte mux 301 is a pair of indices I:Q(i) and I:Q(i+1), corresponding to two input values x for table TBL.

Each index I:Q(i), I:Q(i+1) points to a byte subword location within general-purpose register file RGS. The five most-significant bits of each index are combined with the two table-start-position-select bits specified in the instruction to define a 7-bit address to general-purpose-register file RGS. Thus, each index I:Q(i), I:Q(i+1) selects a respective general-purpose register A:HH(i), A:HH(i+1). (The selected general-purpose registers can be the same or different).

The least-significant three bits of each index I:Q(i), I:Q(i+1) are used to select respectively a byte position within the respective selected general-purpose register, A:HH(i), A:HH(i+1). The resulting two bytes of data D:HH(i), D:HH(i+1) are both stored in the result register specified by the RLookup instruction in byte positions corresponding to those at which indices A:HH(i), A:HH(i+1) are stored. Other byte positions within the result register are overwritten with zeroes. To pack registers, four results can be ORed.

Note that example 4 provides double the parallelism of examples 1-3 for approximately double the throughput. Relative to the prior art, the throughput is four or eight times faster with four functional units.

Example 5

This is the same as example four, except the instructions Rlookup5DP.01, Rlookup5DP.23, Rlookup5DP.45, and Rlookup5DP.67 preserve result register contents not required for storing results. Thus, successive instructions can write to different subword locations of the same result register. This avoids the necessity of ORing results to concatenate the results. However, the dependency depth is four unless the results are written in parallel.

However, an additional read port is required per functional unit if the contents preserving is achieved by reading the result register, modifying its contents, and then rewriting it. Since general-purpose processors rarely provide three read ports per functional unit, this approach is most appropriate for a special purpose processor that provides three read ports per functional unit. Alternatively, if the result register has individual byte or doublet writes, a third read port is not required.

The invention provides for different numbers of read ports per functional unit. While two read ports are typical, functional units can have as few as one read port. Also, three or more read ports are provided for. The invention provides for using from one up to all of the available read ports. For example, the invention provides for using one read port for indirect indexing and the other for direct indexing (where the instruction specifies a subword location of a general-purpose data register directly).

The present invention can be used with or without parallel memory reads. For example, if there are six functional units, as in the Itanium 2 micro-architecture, four can be used for indirect register reads, while two are used to read values from memory.

The invention provides for different methods of loading entry values into the index registers. The loading can be direct to the index registers, or indirect, via the general-purpose registers, depending on the instruction set. Again depending on the instruction set, indices can be loaded one at a time or in packed lines. In one embodiment, an entire level-1 cache line or a multi-subword segment thereof can be loaded directly into one or more index registers. In this regard, it is not necessary that the index-register length match the general-purpose-register length.

As an alternative to dedicated index registers, the invention provides for instructions that specify general-purpose registers to act as index registers. In that case, a general-purpose register serving as an index register can be accessed before other general-purpose registers.

The invention provides for different relations between functional units and index registers. In some embodiments, each functional unit can access all index registers. However, in other embodiments, index registers are dedicated to specific functional units.

The invention provides for having only one possible location for a table in the general-purpose register file. In that case, the table location need not be specified by the indirect-indexing instruction. Alternatively, there can be plural locations. For example, some embodiments allow a table to begin at an arbitrary register or even an arbitrary subword location of an index file. Of course, in the latter cases, more bits are required to specify the table start location.

The invention provides for tables with different numbers of entries and different entry sizes. In addition, different register sizes and different numbers of general-purpose registers, index registers, and functional units are provided for. These and other variations upon and modifications to the present invention are provided for by the present invention, the scope of which is defined by the following claims.

What is claimed is:

1. A microprocessor comprising:
registers, each of said registers having plural locations at different positions within that register;
an instruction decoder for decoding instructions, said instructions including first and second indirect-indexing instructions, said first indirect-indexing instruction specifying a first index register of said registers, a first result register of said registers, and a first position of said positions, said second indirect-indexing instruction specifying a second index register of said registers, a second result register of said registers, and a second position of said positions, said second position being different from said first position; and
an execution unit for executing
said first indirect-indexing instruction so as to write a first result at said first position within said first result register, said first result being at least in part a function of data stored at a first data-storage location at a third position within a first data-storage register of said registers, said first data-storage register and said third position being determined by a first index stored at said first position within said first index register, and said second indirect-indexing instruction so as to write a second result at said second position within said second result register, said second result being at least in part a function of data stored at a second data-storage location at a fourth position within a second data-storage register of said registers, said second data-storage register and said fourth position being determined by a second index stored at said second position within said second index register.

2. A microprocessor as recited in claim 1 wherein said instructions include a series of n indirect-indexing instructions, each of said n indirect-indexing instructions specifying the same index register and a different position.

3. A microprocessor as recited in claim 1 wherein said first indirect-indexing instruction has an instruction field that specifies said first position.

4. A microprocessor as recited in claim 1 wherein said first indirect-indexing instruction has an opcode that specifies said first position.

5. A non-transitory computer readable media comprising a program of computer-executable instructions, said program including first and second indirect-indexing instructions, said first indirect-indexing instruction specifying a first index register of said registers, a first result register of said registers, and a first position, said second indirect-indexing instruction specifying a second index register of said registers, a second result register of said registers, and a second position, said second position being different from said first position, said first indirect-indexing instruction, when executed, writing a first result at said first position within said first result register, said first result being at least in part a function of data stored at a first data-storage location at a third position within a first data-storage register of said registers, said first data-storage register and said third position being determined by a first index stored at said first position within said first index register, and said second indirect-indexing instruction, when executed, writing a second result at said second position within said second result register, said second result being at least in part a function of data stored at a second data-storage location at a fourth position within a second data-storage register of said registers, said second data-storage register and said fourth position being determined by a second index stored at said second position within said second index register.

6. Media as recited in claim 5 wherein said program includes a series of a indirect-indexing instructions, each of said a n indirect-indexing instructions specifying the same index register and a different position.

7. Media as recited in claim 5 wherein said first indirect-indexing instruction has an instruction field that specifies said first position.

8. Media as recited in claim 5 wherein said first instruction has an opcode that specifies said first position.

* * * * *

UNITED STATES PATENT AND TRADEMARK OFFICE
CERTIFICATE OF CORRECTION

| | | |
|---|---|---|
| PATENT NO. | : 8,452,945 B2 | Page 1 of 1 |
| APPLICATION NO. | : 10/245106 | |
| DATED | : May 28, 2013 | |
| INVENTOR(S) | : Dale Morris | |

It is certified that error appears in the above-identified patent and that said Letters Patent is hereby corrected as shown below:

In the Specification:

In column 1, line 37, delete "general register" and insert -- general-purpose register --, therefor.

In column 1, lines 39-40, delete "general register" and insert -- general-purpose register --, therefor.

In the Claims:

In column 8, line 22, in Claim 6, delete "a indirect-indexing" and insert -- n indirect-indexing --, therefor.

In column 8, line 23, in Claim 6, delete "a n" and insert -- n --, therefor.

Signed and Sealed this
Twentieth Day of August, 2013

Teresa Stanek Rea
*Acting Director of the United States Patent and Trademark Office*